May 7, 1963 D. WILLISON 3,088,768
FREIGHT HANDLING SYSTEM
Filed Oct. 22, 1959
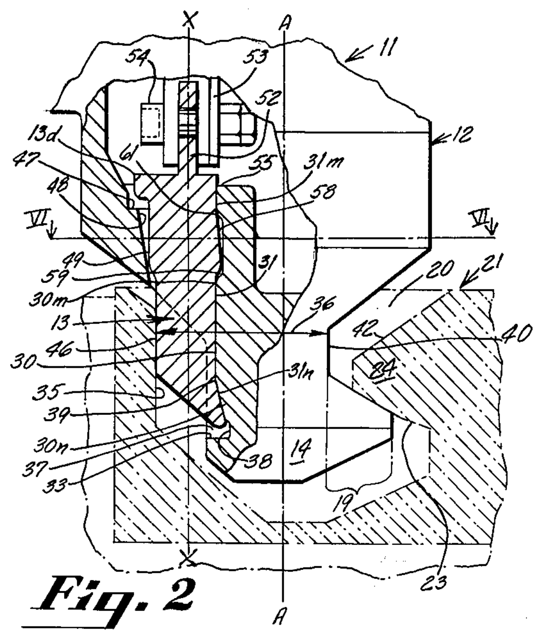
Fig. 2
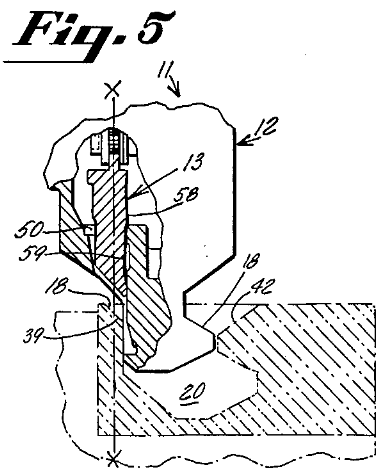
Fig. 5
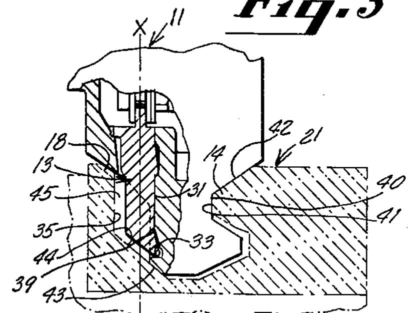
Fig. 3
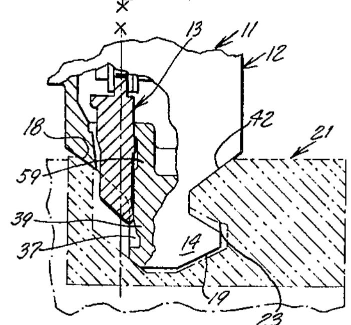
Fig. 4
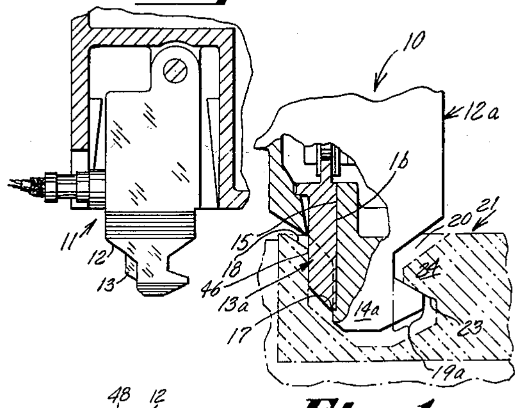
Fig. 7
Fig. 1
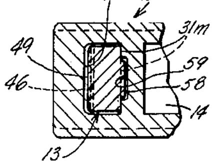
Fig. 6
INVENTOR.
DONALD WILLISON
BY Henry Kozak
ATTORNEY United States Patent Office 3,088,768 Patented May 7, 1963

3,088,768
FREIGHT HANDLING SYSTEM

Donald Willison, Lyndhurst, Ohio, assignor to National Castings Company, a corporation of Ohio Filed Oct. 22, 1959, Ser. No. 848,087
11 Claims. (Cl. 294—93)

This invention relates to a freight handling system embodying a lifting device and an article of frieght which are interlockable within a socket provided by e.g., the freight article, by extension thereinto of a complemental portion of the device. The invention is concerned particularly with anti-creep structure for positively interlocking the device and the article.

The present invention is further closely related to what is termed, in the transportation industry, as "containerization." This term embraces the concept of transporting freight packed in large crane-portable containers from the shipper's dock to the consignee's dock by any type of carrier, or by different carriers, without intermediate opening of the containers or any handling of the goods in less-than-container-load quantities. Of recent appearance in the industry is a lifting system applicable to the handling of such containers utilizing a container having a plurality of L-shaped sockets extending inwardly from its top surface, and a lifting implement having a like-plurality of coupling devices spaced in the same horizontal pattern as the sockets of the container. Each coupling device comprises a downwardly extending L-shaped member and a vertically retractable lock of which the latter, when positioned in locking position alongside the L-shaped member, cooperates with the L-member to complementally fit with a corresponding socket of the container. The discovery has been made that under some conditions of loading and operation, a lock may work upward within a socket relative to the L-member to release the corresponding lifting device from its socket. In the loading or unloading of a ship, the possible consequences of such an event are not difficult to contemplate.

Hence, it is the primary object of this invention to provide an automatically coupling freight container and container-lifting system providing positive protection against accidental uncoupling and lock-creeping.

A further object is to provide the freight handling system of the foregoing object with an anti-creep system which automatically becomes inoperative during release of the lifter from the container but automatically becomes operative as the lifter draws up on its load.

In brief, this invention is concerned essentially with a system for handling an article of freight, such as a freight container employing a lifting device embodying anti-creep mechanism and adapted to fit complementally within an L-shaped opening of the article in interlocking relation therewith. The device comprises an L-member having a shank extending lengthwise between a supported end and a free end thereof, and a toe extending laterally from the shank adjacent its free end; a lock reciprocably supported along the side of the shank opposite that from which the toe projects; guides associated with the member determining an ambit lenghtwise of the shank for the lock; and structure acting between the lock and the shank to cam the lock outwardly from the face of the shank upon movement of the lock from the end to its ambit near the free-end of the shank.

In the accompanying drawing:

FIG. 1 is a fragmentary elevation in section of a lifting system which does not incorporate the present invention.

FIG. 2 is a fragmentary elevation in section of the single embodiment of the invention illustrated by the drawing showing a lifting device in position for lifting an article interlocked therewith.

FIG. 3 is a fragmentary elevation in section of the system of FIG. 2 with the lifting device in position for retraction of a lock thereof from the locking position illustrated to a releasing position.

FIG. 4 is a fragmentary elevation in section of the system of FIG. 2 with the lock partiallly retracted.

FIG. 5 is a fragmentary elevation in section showing the system in FIGS. 2 to 4 with the device partially withdrawn from the article and the lock fully retracted.

FIG. 6 is a fragmentary transverse section taken along line VI—VI of FIG. 2.

FIG. 7 is an elevation of the device of FIGS. 2 to 6 showing its mode of attachment to a crane member.

FIG. 1 illustrates a general type of lifting arrangement lacking the anti-creep structure upon which the present invention is based. The unimproved device or lifter 10 of FIG. 1 comprises a housing or member **12*a* and a lock 13*a* in slidable face-to-face contact with a shank 14*a* attached by its supported end to the upper hollow portion of the member. The member 12*a* further comprises a toe 19*a* intergral with the shank and projecting therefrom transversely to its length adjacent the free end of the shank. The lock 13*a* engages a longitudinal, outwardly-facing lateral surface 15 of the shank along its own longitudinal inboard surface 16. It is now recognized that, when the surfaces 15 and 16 are planate, vibrations and jostling of the lifter 10 relative to the article 21 may result in endward movement of the lock from a locking position against an abutment surface 17 to a releasing position further from the free end of the shank 14*a* disposing the lock generally upwardly within the housing 12*a*. When the lock has worked to a point outwardly of the cavity 20 beyond a gathering surface 18 partly defining the tapered entrance periphery of the cavity, the device 10 is released with respect to the article 21**.

The present invention modifies the structure of the lock and the shank to bring about a camming engagement of the lock and the shank tending to forcibly tilt the lock laterally outwardly with respect to the shank in the event of any movement of the lock from its locking position. In this manner, the overall transverse dimension of the lock and the shank perpendicular to the length of the shank tends to be increased to render further withdrawal of the lock through the throat of the cavity 20 impossible.

FIGS. 2 to 7 illustrate a lifting system embodying anti-creep mechanism not contained in the unimproved version of FIG. 1. Structural features of the lifting device 11 of FIGS. 2 to 7, having counterparts in FIG. 1, identified by a numeral containing the letter *"a,"* are identified in FIGS. 2 to 7 by the same numeral without the *"a."* The system of FIGS. 2 to 7 is distinguished primarily by the contour of the opposed relatively traversable surfaces 30 and 31 of the shank 14 and the lock 13, respectively, in contra-distinction to the counterpart surfaces 15 and 16 of FIG. 1. For lateral displacement of the lock relative to the shank, accompanying relative longitudinal displacement thereof, the basic requirement is that a portion of the surface 31 be turned inwardly toward the shank along an inclination running from the lock toward the free end of the shank, and the shank surface 30 be offset inwardly to accommodate the inturned portion of the lock at its locking position wherein it rests against an abutment surface 33.

As shown in FIG. 2, the surfaces 30 and 31 comprise, for the major part, planate portions **30*m* and 31*m* adapted for continuous face-to-face engagement at or near the locking position of the lock relative to the shank 14. The surfaces 30, 31 comprise also inturned portions 30*n*** and 31*n* which engage after a slight movement of the lock away from the abutment surface 33. In the posture illustrated by FIG. 2, a laterally outward camming force is exerted on the lock at surface 31*n* as transmitted thereto from surface 30*n* and a point 39 at the junction of the surfaces 30*m* and 30*n*. In this situation, the lock is not forced outwardly from the shank because of the opposition of the wall 35. Such opposition results in a downward component of force parallel to the surface portions 30*m* and 31*m* acting on the lock along the surface portions 30*n* and 31*n*. The force relationship is such that under loaded, slightly jostling conditions of operation the lock will adjust inwardly to restore face-to-face relation of the surface portions 30*m* and 31*n*, if under some unusual condition of operation, the lock becomes cammed outwardly from the shank. In noting this result, attention is directed to the arrangement wherein the surfaces 30*n* and 31*n*, particularly the surface 31*n*, have a smaller angle of inclination with a longitudinal axis A—A of the shank than the undersurface 23 of the tongue 24 in the cavity 20. However, the angle in each case is less than 90 degrees. The forces set up internally of the device and between the device and the cavity surfaces by a strong lifting force tending to separate the lifter from the article make impossible, short of fracture, any overall expansion of the lock and the shank transversely to the axis A—A along the arrow 36. On the other hand, the lock 13 is displaced laterally outwardly from the shank very readily when there is clearance (see clearance 45) between it and the cavity wall 35 under the conditions illustrated in FIG. 4.

The cam relationship of the lock 13 with the shank is the result primarily of the occurrence of a recess 37 inwardly offset from the plane of the surface portion 30*m*. At its one extremity, the recess begins at corner 39 whereat surface portions 30*m* and 30*n* merge. The recess is further defined by the abutment surface 33 and a bottom surface 38. Camming action occurs primarily between a small surface defining the corner 39 and the surface portion 31*n* of the lock. The recess is made larger than the inturned portion of the lock, which is disposed therein at locking position, to promote self-cleaning action and to obtain face-to-face contact of surface portions 30*m* and 31*m* in the event that the recess 37 accumulates dirt and corrosion. Within the practice of this invention, the recess may obviously assume different contours between the line 39 and the abutment surface 33 as long as there is adequate room therein for the inturned portion of the lock.

FIG. 3 is illustrative of the position of the device 11 at which the lock may be withdrawn upwardly for retraction of the device from the article 21. At this position, the device is seated squarely on the gathering surfaces 18 and 42 and the lateral surface 40 of the shank is forced firmly against the end surface 41 of the toe 14 as a result of camming action between a heel surface 43 of the shank with an inclined surface 44 of the cavity. Thrusting the device 11 inwardly of the cavity to produce the seating illustrated results in a clearance 45 between the lock 13 and the wall 35.

Conditions are now favorable for withdrawal of the lock 13 from locking position away from the free end of the shank upwardly into the housing 12. The lock is shown in FIG. 4 in a partially retracted position in which it has just completed withdrawal of its inturned end portion from the recess 37. However, before the device may be withdrawn from the cavity, the lock must be retracted to approximately the position relative to the housing shown in FIG. 5 in order that the toe 19 may clear the tongue 24.

Obvious from the foregoing description is that the transverse dimension of the L member, i.e., the shank 14 and the toe 19, is no greater (or slightly less) than that of the shank portion of the cavity 20, i.e., the distance between the tongue surface 41 and the wall surface 35, to permit vertical passage of the member in and out of the cavity. Because it is necessary to retract the lock while it is cammed outwardly relative to the shank, the transverse dimension of the cavity shank portion is greater than the expanded transverse dimension of the lock 13 and the shank 14 with the lock withdrawn from locking position into outwardly cammed relation with the shank. However, the transverse dimension of the cavity shank portion is less than that of the overall transverse dimension cavity-entrant portion of the device including the above expanded transverse dimension and the length of the toe 19 in a lateral direction from the shank axis A—A.

To briefly review the steps involved in uncoupling the device 11 from the article 21, a lifting force, such as applied to the device lifting the article, is reduced sufficiently to permit the device to settle out of the wedged relation with surfaces of the cavity shown in FIG. 2. As the lifter settles into seating relation with the article, as shown in FIG. 3, the lock also settles against the abutment surface 33. The device 11 is now in condition for retraction of the lock upwardly lengthwise of its entire ambit through the stage shown in FIG. 4 and to the finally retracted position of the lock relative to the device, as shown in FIG. 5. The device may thereupon be withdrawn from the cavity 20.

The above steps are conducted in reverse order to effect coupling of the device 11 with the article 21, with the exception that the device may approach the article for coupling therewith with the lock in its locking position against the abutment surface 33. On account of the very shallow inclination of the surface portions 30*n* and 31*n* with the longitudinal axis of the shank, the lock 13 is readily jarred and slid out of its locking position upon contact with the gathering surface 18 of this cavity 20. The lock slides upwardly or away from the free shank end to an almost fully retracted position in which the shank and toe of the device are allowed to pass through the shank portion of the cavity 20. As the toe enters the toe portion of the cavity to an extent placing a planate portion 46 of the outboard surface of the lock just inwardly of the cavity surface 35, the lock, in traversing its ambit in a downward stroke, drops into the position shown in FIG. 3. As shown, surface portion 46 is generally parallel to the inboard surface portion 31*m*. To prevent the lock from being subjected to undesirable bending stresses which might arise under conditions of severe loading accompanied by rocking of the device in its cavity 20, the surface portions 46 and 31*m* terminate at their lower ends in a plane approximately perpendicular thereto.

Because it is necessary for the lock to effect a slight pivoting motion in sliding into its locking position from the outwardly cammed condition relative to the shank shown in FIG. 4, and to assure that such motion will be positively effected, the housing 12 is provided with a surface 48 which cooperates with portion 49 of the outboard surface of the lock to positively cam the end portion of the lock near the free end of the shank into the recess 37. The convexly curvate surface portion 49 protrudes laterally outwardly with respect to the plane of surface portion 46. The surface 48 and the opposite portion of the shank surface 30 define opposite sides of the periphery of an opening 50 in the housing 12 through which the lock 13 moves inwardly and outwardly of the hollow portion of the housing. The surface 48 is inclined toward the free end of the shank with respect to the opposing outboard lateral surface of the lock and also with respect to the longitudinal lateral surface 30 of the shank. The surface 48 is inclined at a very shallow angle with the longitudinal direction of the shank and is aligned generally parallel with the path followed by the surface 49 during retraction of the lock from its locking position. It is spaced sufficiently from the surface 30 to allow free passage of the lock through the opening without any restricting frictional interference or wedging. When the lock 13 is seated at its lowest position relative to the housing 12, a lip 13*d* of the lock rests on a shoulder 47 defining the upper end of the surface 48. At this position of the lock, there is substantially no clearance between the lower heel of the lock surface portion 49 and the lower end of the housing surface 48.

When the means for retracting the lock to the releasing position shown in FIG. 5 is, e.g., a solenoid (not shown) mounted in the housing 12, it is desirable to construct the device 11 in a manner avoiding jackknifing at the connection of the lock with the solenoid plunger. The tendency to jackknife exists when the lock-plunger assembly is propelled to retracted position by an impact force applied to the lock. One hazard from jackknifing is that the solenoid may be damaged internally.

As shown, the lock 13 is connected by a typical fork-joint comprising an eye-boss 52 of the lock, a fork-end 53 of a solenoid plunger, and a bolt 54 extending through the fork-end and the brass. As looseness from wear develops in this joint, there is an increasing tendency of the joint to jackknife toward the right, as viewed in the figures, when lock-plunger assembly is thrust by force applied to the lock to a position wherein a substantial portion of the lock protrudes inwardly of the housing past the end 55 of the surface 30.

Such jackknifing is overcome by structure for guiding the head portion and eye-boss of the lock along the path of reciprocation of the plunger. Structure optionally provided for this purpose comprises a hump 58 extending laterally inwardly toward the axis A—A from the plane of the surface portion 31*m*. The hump 58 is received in its entirety, at locking position of the lock, within a recess 59 extending inwardly from the plane of the shank surface portion 30*m*. As shown in FIG. 2, the end of the hump further from the free shank end engages the corner 61 defining that portion of the periphery of the recess 59 in the surface 30*m* furthest from the free shank end just as surface 31*n* of the lock engages the surface 30*n* of the shank. As further shown, the recess 59 has a length permitting the inturned portion of the lock to engage the abutment surface 33.

In the various positions of lock retraction shown by FIGS. 2 to 5, the conformation of the hump 58 provides the proper displacement of the head portion of the lock from the surface 30 to maintain the eye-boss 52 along the plunger path X—X. The height of the hump relative to the lock surface 31 at any point along its length in contact with the corner 61 is proportional to the angular displacement of the surface 31 with the path of the plunger. Preferably, the plunger path is parallel to surface portion 30*m* of the shank.

The anti-creep mechanism herein described as an improvement of device 10 of the freight lifting system illustrated in FIG. 1 adds but slightly to the cost of manufacturing the latter system and greatly adds to its safety and efficiency in operation. In casing the parts of improved device 11, for example, additional costs are limited primarily to those incurred in making slightly more complicated sand molds than required for making the unimproved device 10.

The terms and expressions which have been employed are used as terms of description and not of limitation and there is no intention of excluding any equivalents of the invention described or of the portions thereof as fall within the purview of the claims.

What is claimed is:

1. A lifting device comprising: an L-member comprising a shank extending lengthwise between a supported end and a free end, and a toe extending laterally from the shank adjacent its free end; means for supporting the L-member joined to the member at said supported end of the shank; a lock means for supporting the lock along the side of the shank opposite to that from which the toe projects; guide and stop means on the member defining an ambit of reciprocation of the lock lengthwise of the shank; and means comprising cooperating portions of the lock and shank for camming the lock outwardly from said side of the shank upon movement of the lock from the end of said ambit nearer said free end.

2. A lifting device comprising: an L-shaped member comprising a shank extending lengthwise between a supported end and a free end, and a toe extending laterally from the shank adjacent its free end; means for supporting the L-member joined to the member at said supported end of the shank; a lock; means for supporting the lock along the side of the shank opposite to that from which the toe projects; stop and guide means on the member defining an ambit of reciprocation for the lock between a locking position and a releasing position, said releasing position being further in the lengthwise direction of the shank from the free end than the locking position; said lock being supported against a substantially straight face portion of the shank generally parallel to the length of the shank; said lock, at said locking position, having a portion extending past said face portion of the shank toward said free end and inclining laterally inwardly with respect to the shank.

3. A lifting device adapted for interlocking with an article within an L-shaped cavity thereof generally complementary to a substantial portion of the outer surface, the device comprising: an L-shaped member comprising a shank having a supported end and a free end spaced along its length, and a toe fixed to the shank adjacent its free end and projecting from the shank transversely with respect to its length; means for supporting the L-member joined to the member at said supported end of the shank; a lock having an inner lateral face; means for supporting the lock in opposed slidable relation with an outer longitudinal face of the shank on the side thereof opposite to that from which said toe projects; said longitudinal face is combination with side and end stop means defined by the device and including said member defining an ambit for the lock extending lengthwise of the shank from a locking position to a releasing position, said releasing position being further in the lengthwise direction of the shank from said free end than the locking position; said lock face and the portion of said shank face in opposed coextending relation with the lock face being substantially complementary and in continuous lengthwise contact at said locking position; at least one of said faces having an area inclined with respect to the general longitudinal direction of the faces for camming said lock laterally outwardly with respect to the shank in movement of the lock out of locking position along said ambit.

4. A lifting device comprising: an L-member having a shank extending lengthwise between a supported end and a free end, and a toe fixed to the shank adjacent its free end and projecting therefrom transversely with respect to its length; means for supporting the L-member joined to the member at said supported end of the shank; a lock having an inboard face in generally planately engaged slidable relation with a lateral longitudinal surface of the shank on the side thereof opposite that from which the toe projects; a pair of spaced guide surfaces running longitudinally of the shank in angled relation with said longitudinal surface and an abutment surface at the end of said longitudinal surface nearer said free end defining, with said longitudinal surface, an ambit for the lock lengthwise of the shank between a locking position against said abutment surface and a releasing position farther from said free end than said locking position; the end portion of said lock nearer said abutment surface being inturned toward the shank by an angle less than 90 degrees with respect to said inboard face; said shank having a recess between said longitudinal surface and said abutment surface for receiving said inturned end portion.

5. The device of claim 4 wherein: the depth of said recess provides clearance between the inboard side of the inturned lock portion and the shank at said locking position of the lock.

6. The device of claim 4 having a wall surface in opposed laterally spaced relation with a portion of said longitudinal surface adjacent the supported end of the shank to define opposite sides of an opening occupied by a head portion of the lock at said locking position; said wall surface extending toward the face end of the shank at an inclination inwardly with respect to said longitudinal surface; said head portion having greater thickness in a direction transversely to said longitudinal surface than an intermediate portion of the lock connecting the head portion and the inturned portion; said head portion fitting loosely at substantially no clearance between the ends of said sides of the opening nearer said free shank end; said wall inclining in a direction away from said free shank end and said longitudinal surface to avoid wedging thereof with the head portion in tilting movement of the lock out of locking position to a position placing said inturned portion on said longitudinal surface.

7. The device of claim 6 wherein: said intermediate portion of the lock has an outboard surface parallel to said inboard face and the head portion has an outboard surface in convexly protruding relation with respect to said outboard surface of the intermediate portion.

8. A lifting device comprising: an L-member having a shank extending lengthwise between a supported end and a free end, and a toe fixed to the shank adjacent its free end and projecting therefrom transversely with respect to its length; means for supporting the L-member joined to the member at said supported end of the shank; a lock having an inboard face; means for supporting the lock with said face in generally planately-engaged slidable relation with a lateral longitudinal surface of the shank on the side thereof opposite that from which the toe projects; said member having guiding means extending lengthwise of said longitudinal surface and stop means at the end of the longitudinal surface nearer said free end defining, with said longitudinal surface, an ambit for the lock lengthwise of the shank between a locking position against said stop means and a releasing position farther from said free end than the locking position; the end portion of the lock near said stop means being inturned toward the shank by an angle less than 90 degrees with respect to said inboard face; said shank having a recess between said longitudinal surface and said abutment surface for receiving said inturned portion; a reciprocator movable along a path parallel to the length of said longitudinal surface for reciprocating the lock lengthwise of its ambit disposed longitudinally beyond, and connected to, a head end portion of the lock opposite said inturned portion; a hump in said inboard lock face; said shank having a recess in said longitudinal surface for receiving said hump at the locking position of the lock; said hump being tapered to engage a surface immediately adjacent the intersection of said longitudinal surface that portion of the recess farthest from said stop means to maintain a desired alignment of said head end portion with said reciprocator path in movement of lock away from said stop means.

9. The device of claim 8 wherein: both of said recesses have lengths correlated with the lengths of said inturned lock portion and said hump allowing a slight movement of the lock away from the stop means with said inboard face in said planately-engaged relation with the longitudinal surface.

10. In combination: an article to be lifted having an L-shaped cavity comprising a shank portion extending inwardly from an outside surface of the article and an inward toe portion; and a lifting device adapted to fit generally complementally within said cavity in interlocking relation with the article; the device comprising: an L-member comprising a shank having a supported end and a free end spaced along its length, and a toe extending laterally from the shank adjacent its free end; means for supporting the L-member joined to the member at said supported end of the shank; the overall transverse dimension of the shank and toe being no greater than that of the shank portion of the cavity for passage of the member therethrough; a lock supported along the side of the shank opposite to that from which the toe projects; stop and guide means on the member defining an ambit of reciprocation for the lock lengthwise of the shank between a position within said cavity shank portion for locking the device in said cavity to a releasing position disposing the lock outside of the cavity when occupied by the member; and means comprising cooperating portions of the lock and shank for camming the lock outwardly from said side of the lock upon movement of the lock from the end of said ambit nearer said free end; said transverse dimension of the cavity shank portion being greater than an expanded transverse dimension of the shank and the lock concurring with an actuated condition of the cam means and displacement of the lock from locking position; said dimension of the shank portion being substantially less than an overall dimension including said expanded dimension over the length of the toe.

11. In combination: an article to be lifted having an L-shaped cavity comprising a shank portion extending inwardly from an outside surface thereof, an inward toe portion, and a lifting device adapted to fit generally complementally within said cavity in interlocking relation with the article; the device comprising: an L-member comprising a shank having a supported end and a free end spaced along its length, and a toe fixed to the shank adjacent its free end and projecting from the shank transversely with respect to its length; means for supporting the L-member joined to the member at said supported end of the shank; the overall transverse dimension of the shank, the toe being no greater than that of the shank portion of the cavity for passage of the member longitudinally therethrough; a lock having an inner lateral face in opposed slidable relation with an outer longitudinal face of the shank on the side thereof opposite to that from which the toe projects; means on the shank for supporting the lock; stop and guide means carried by the device and said member thereof; said stop and guide means and said longitudinal face defining an ambit for the lock extending lengthwise of the shank from a locking position to a releasing position farther from said free end than the locking position; the lock, at locking position and interlocked relation of the device with the article, being located within the shank portion of the cavity; the lock in combination with said shank substantially filling said shank portion to an extent preventing lateral displacement of the toe from said toe portion; the lock, at releasing position, being retracted out of said shank portion when any part of said toe occupies said toe portion; said lock face and the portion of said shank face in opposed coextending relation with the lock face being substantially complementary and in continuous lengthwise contact at said locking position; at least one of said faces comprising an area inclined laterally outwardly and in the lengthwise direction of the shank toward said supported end for camming said lock outwardly with respect to the length of the shank in movement of the lock along said ambit out of locking position.

References Cited in the file of this patent

UNITED STATES PATENTS

| | | |
|---|---|---|
| 956,938 | Ciardelli | May 3, 1910 |
| 981,365 | Birnie et al. | Jan. 10, 1911 |
| 1,465,289 | Smith | Aug. 21, 1923 |
| 2,047,139 | Fildes | July 7, 1936 |
| 2,678,166 | Mork | May 11, 1954 |
| 2,719,747 | Layne | Oct. 4, 1955 |
| 2,948,383 | Modrey | Aug. 9, 1960 |